United States Patent [19]
Guest

[11] Patent Number: 5,603,530
[45] Date of Patent: Feb. 18, 1997

[54] GRAB RINGS

[76] Inventor: John D. Guest, Bray, Maidenhead, Berkshire, SL6 2EX, United Kingdom

[21] Appl. No.: 528,203

[22] Filed: Sep. 14, 1995

[30] Foreign Application Priority Data

Sep. 14, 1994 [EP] European Pat. Off. ............ 94306729

[51] Int. Cl.⁶ ............................................. F16L 17/025
[52] U.S. Cl. .......................... 285/105; 285/110; 285/340
[58] Field of Search .................................. 285/340, 104, 285/105, 110

[56] References Cited

U.S. PATENT DOCUMENTS

| | | | |
|---|---|---|---|
| 1,965,273 | 7/1934 | Wilson | 285/340 X |
| 2,147,353 | 2/1939 | Scholtes | 285/340 X |
| 2,201,372 | 5/1940 | Miller | 285/105 |
| 3,007,726 | 11/1961 | Parkin | 287/53 |
| 3,483,789 | 12/1969 | Wurzel | 85/8.8 |
| 3,582,112 | 6/1971 | Pico | 285/105 X |
| 3,976,314 | 8/1976 | Graham | 285/340 X |
| 4,073,514 | 2/1978 | Pate | 285/127 |
| 4,586,734 | 5/1986 | Grenier | 285/340 |
| 4,676,533 | 6/1987 | Gerondale | 285/158 |
| 4,747,626 | 5/1988 | Hama et al. | 285/340 X |
| 4,842,306 | 6/1989 | Zeidler et al. | 285/340 X |
| 5,160,179 | 11/1992 | Takagi | 285/340 |
| 5,295,697 | 3/1994 | Weber | 285/105 X |

FOREIGN PATENT DOCUMENTS

| | | | |
|---|---|---|---|
| 2102518 | 11/1989 | France . | |
| 2356036 | 3/1992 | France . | |
| 2547369 | 3/1993 | France . | |
| 2515093 | 10/1975 | Germany | 285/340 |
| 2354185 | 4/1991 | Germany . | |
| 445800 | 4/1991 | Switzerland . | |

*Primary Examiner*—Dave W. Arola
*Attorney, Agent, or Firm*—Baker & Daniels

[57] ABSTRACT

The disclosure relates to a grab ring comprising an annular element having one set of teeth projecting outwardly at an inclined angle to the annular element to one side thereof and a second set of teeth projecting inwardly at an inclined angle to the annular element to the other side thereof to engage between a pair of inner and outer concentric cylindrical surfaces to permit relative movement between the surfaces in one direction whilst preventing relative movement in the opposite direction.

9 Claims, 10 Drawing Sheets

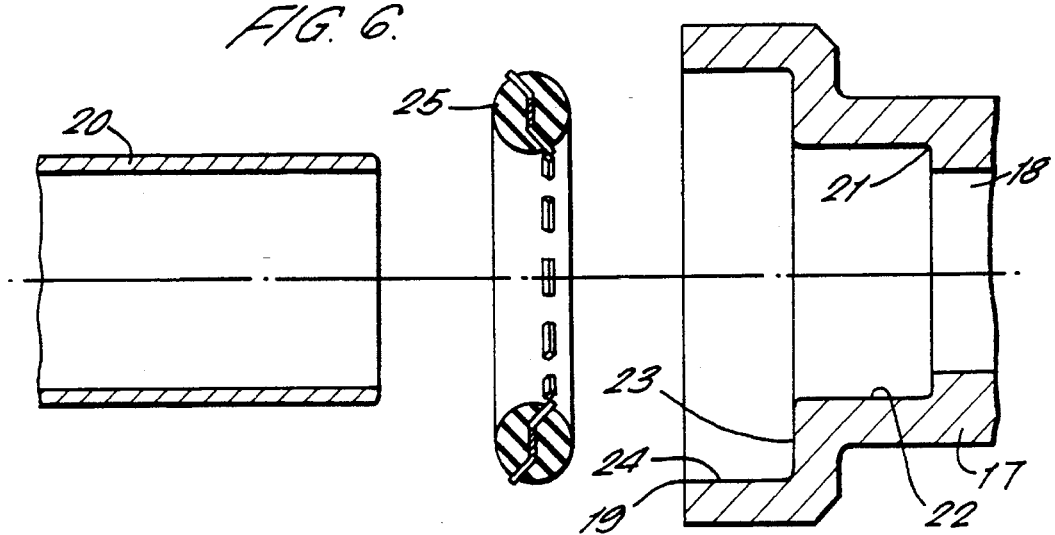
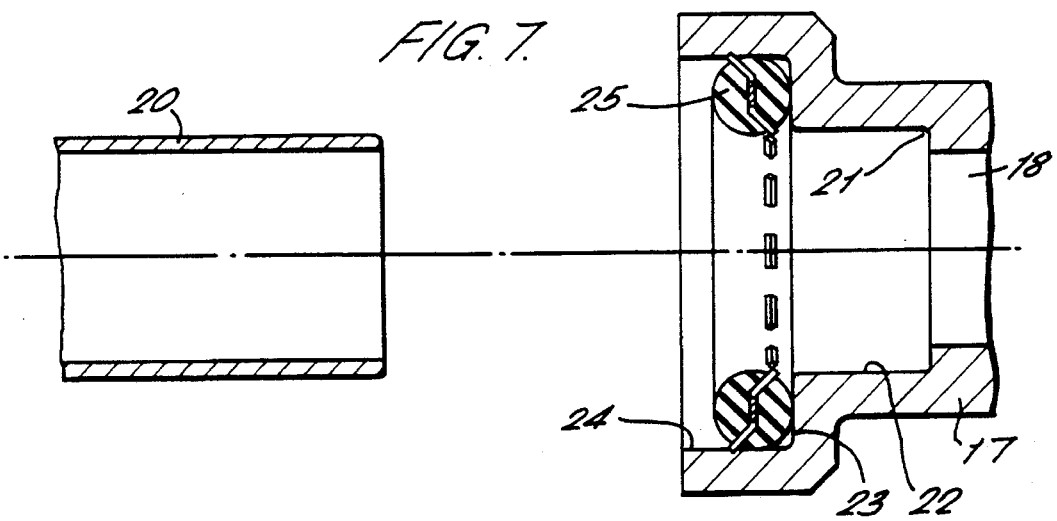
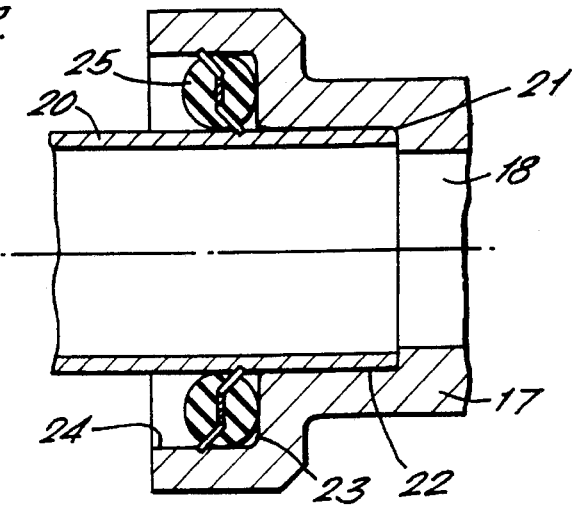

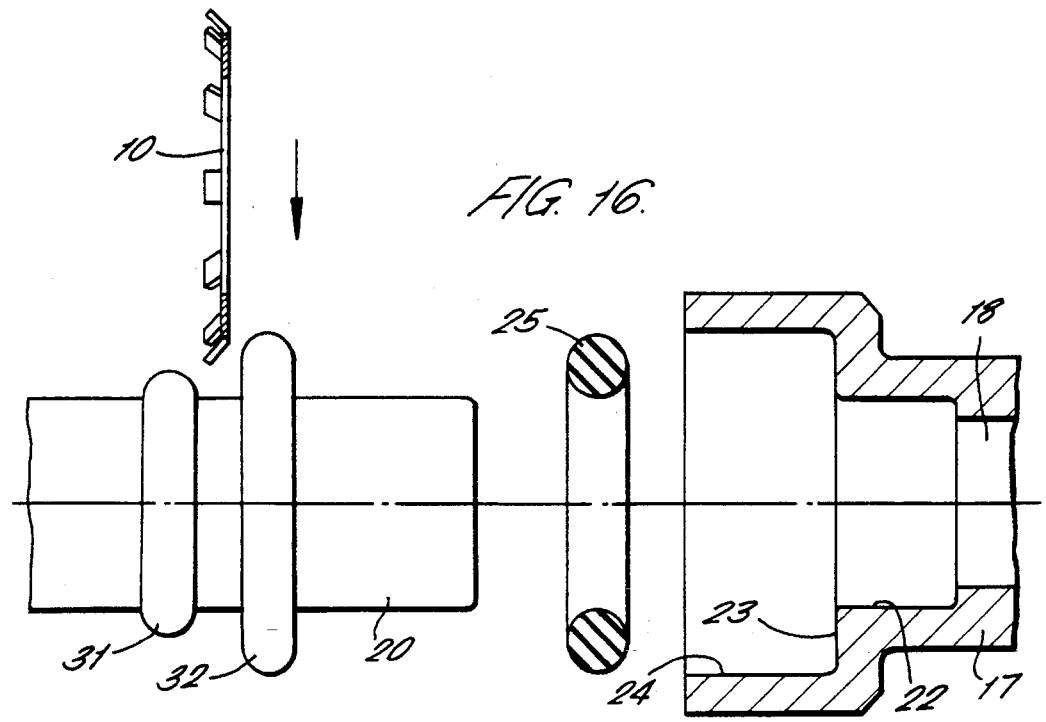
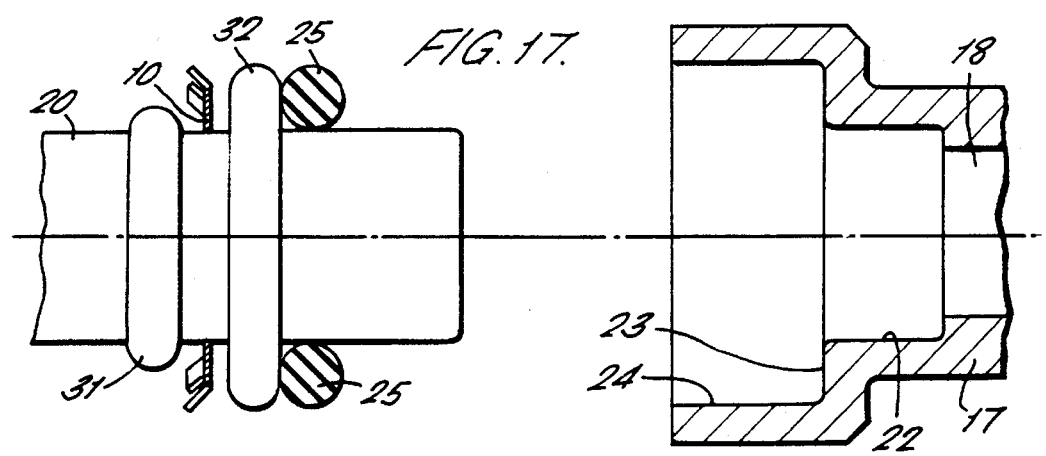
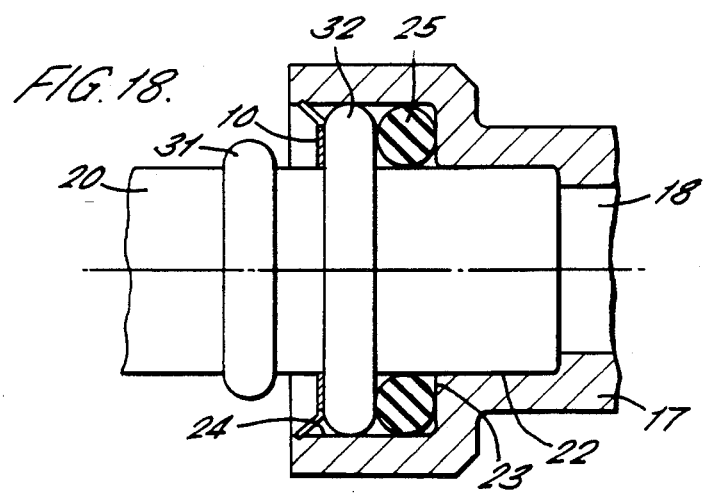

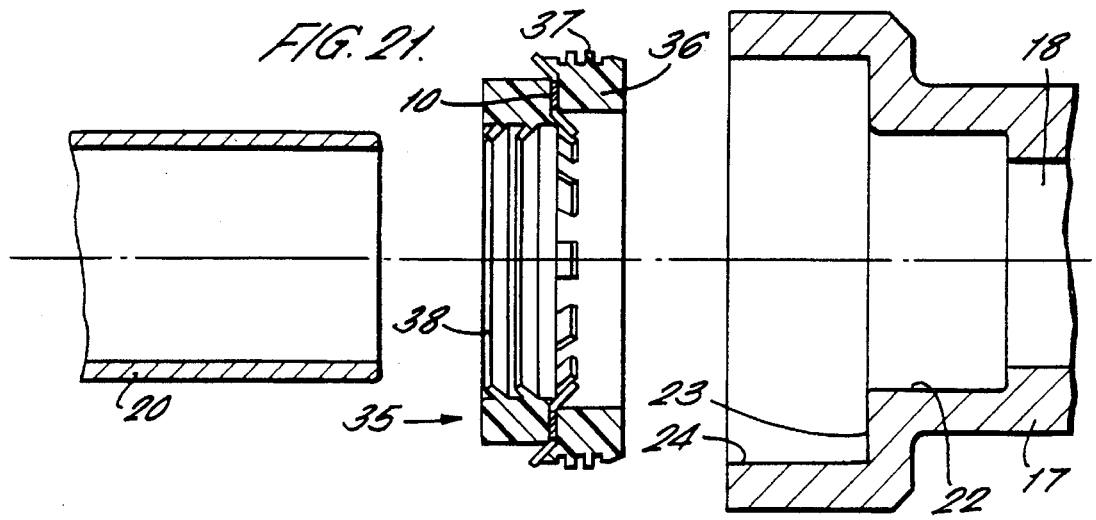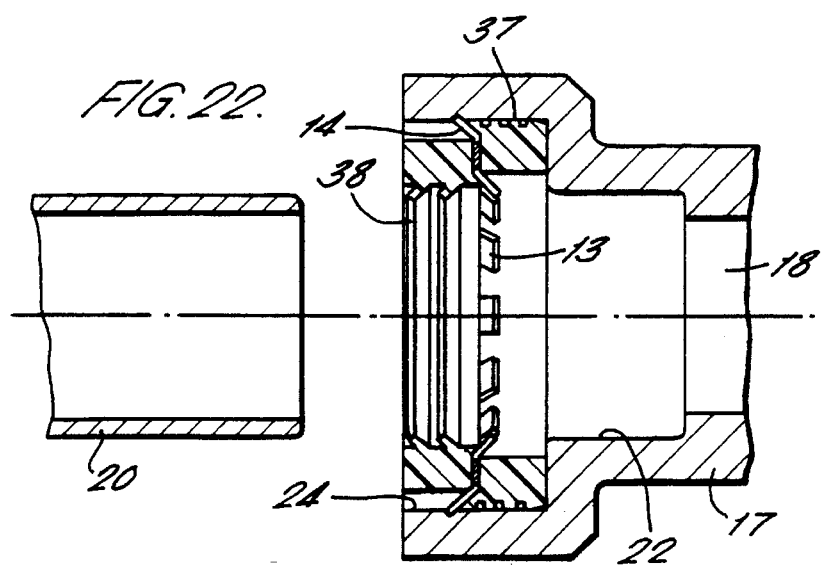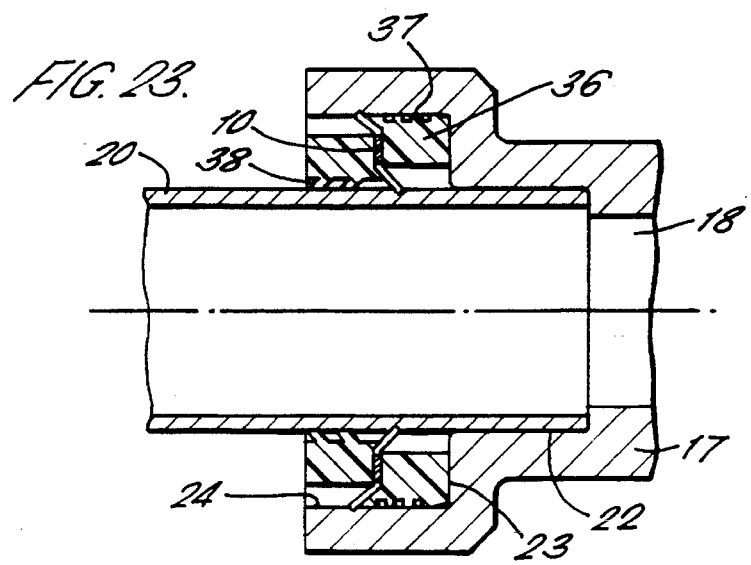

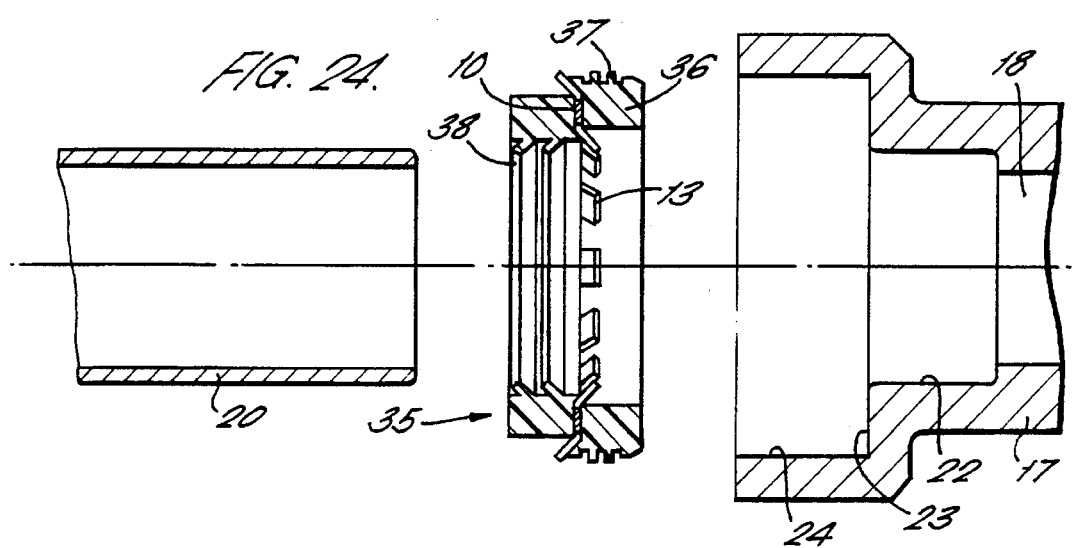
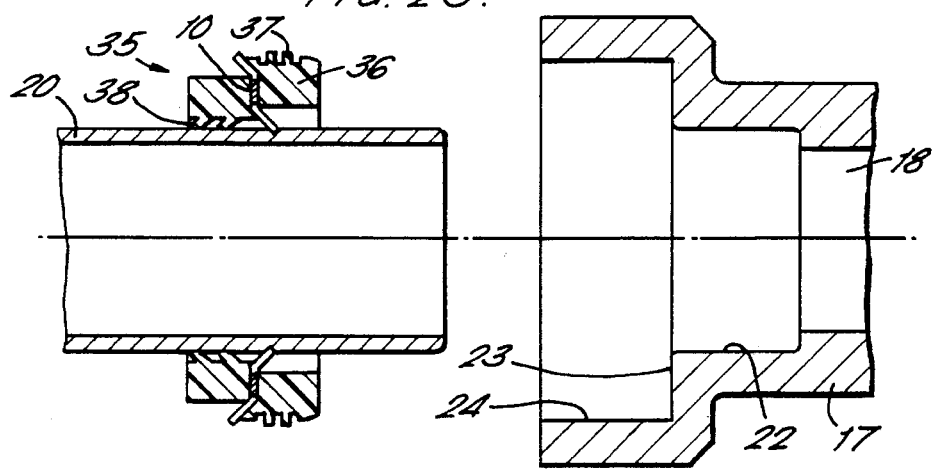
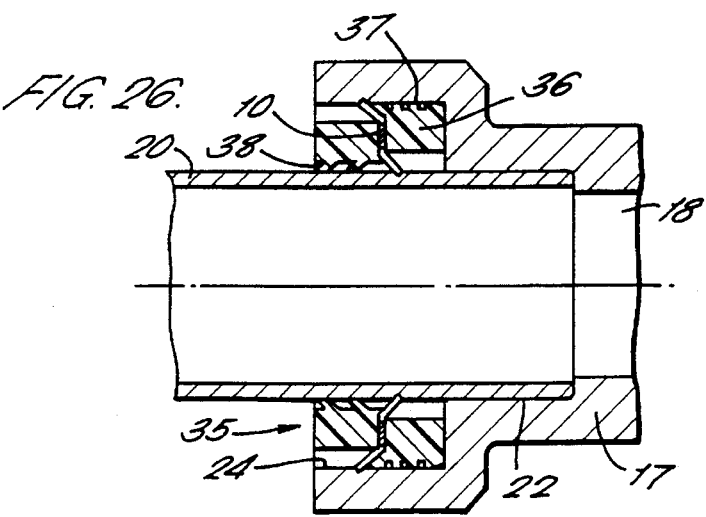

GRAB RINGS

FIELD OF THE INVENTION

The invention relates to grab rings.

BACKGROUND OF THE INVENTION

Grab rings are commonly used in a wide variety of applications where it is required to couple cylindrical components in a bore of another component. A grab ring is mounted on the components and has projecting teeth around its periphery angled to engage with a component, the teeth being arranged so that the cylindrical component can be engaged in the bore in one direction but not extracted.

SUMMARY OF THE INVENTION

This invention provides a grab ring comprising an annular element having one set of teeth projecting outwardly at an inclined angle to the annular element to one side thereof and a second set of teeth projecting inwardly at an inclined angle to the annular element to the other side thereof to engage between a pair of inner and outer concentric cylindrical surfaces to permit relative movement between the surfaces in one direction whilst preventing relative movement in the opposite direction; the teeth being located in pairs directly opposite one another around the edges of the annular element.

The grab ring according to the invention has the advantage that it does not have to be mounted on one or other of the components which the ring is to hold together.

In a preferred form of the invention the annular element lies in a radial plane having radially spaced inner and outer edges, one set of teeth projecting outwardly from the outer edge of the element and angled to the radial plane of the element to one side thereof and the other set of teeth projecting inwardly of the inner edge of the annular element and being angled to the opposite side of the annular plane of the element.

The teeth maybe of generally rectangular shape or the teeth may have radial edges.

A multiplicity of teeth may be provided at spaced locations around said edges of the annular elements.

Furthermore the teeth may be located in pairs directly opposite one another around the edges of the annular element.

In any of the arrangements referred to above the grab ring may be embodied in an annular sealing element with the ends of the teeth of the grab ring projecting from the surfaces of the seal.

In an alternative arrangement the ring may be embodied in a resilient sleeve mid-way along the sleeve with one set of teeth projecting outwardly of the sleeve, the outer periphery of the sleeve having annular sealing ribs to one side of the grab ring and the inner periphery of the sleeve having inner sealing ribs to the other side of the grab ring.

In a further construction according to the invention the ring may have a radial slot through the ring at one location in its periphery to enable the ring to be opened radially for mounting in a radial direction on a pipe or tube.

BRIEF DESCRIPTION OF THE DRAWINGS

FIG. 6 shows a similar assembly of tube and socket to that of FIGS. 3 to 5 in which the grab ring is embodied in the seal;

FIGS. 7 and 8 show the arrangement of FIG. 6 partially assembled and fully assembled respectively;

FIGS. 16 to 18 show a further similar arrangement in which the tube has a pair of spaced encircling beads adjacent its end;

FIG. 21 shows a tube, grab ring/sleeve in accordance with FIG. 20 and socket in alignment ready for assembly;

FIG. 22 shows grab ring/sleeve assembled in the socket ready to receive the tube;

FIG. 23 shows the tube assembled in the socket; and

FIGS. 24 to 26 are similar views to FIGS. 21 to 23 showing a different assembly sequence.

DESCRIPTION OF THE PREFERRED EMBODIMENTS

Figure 1:
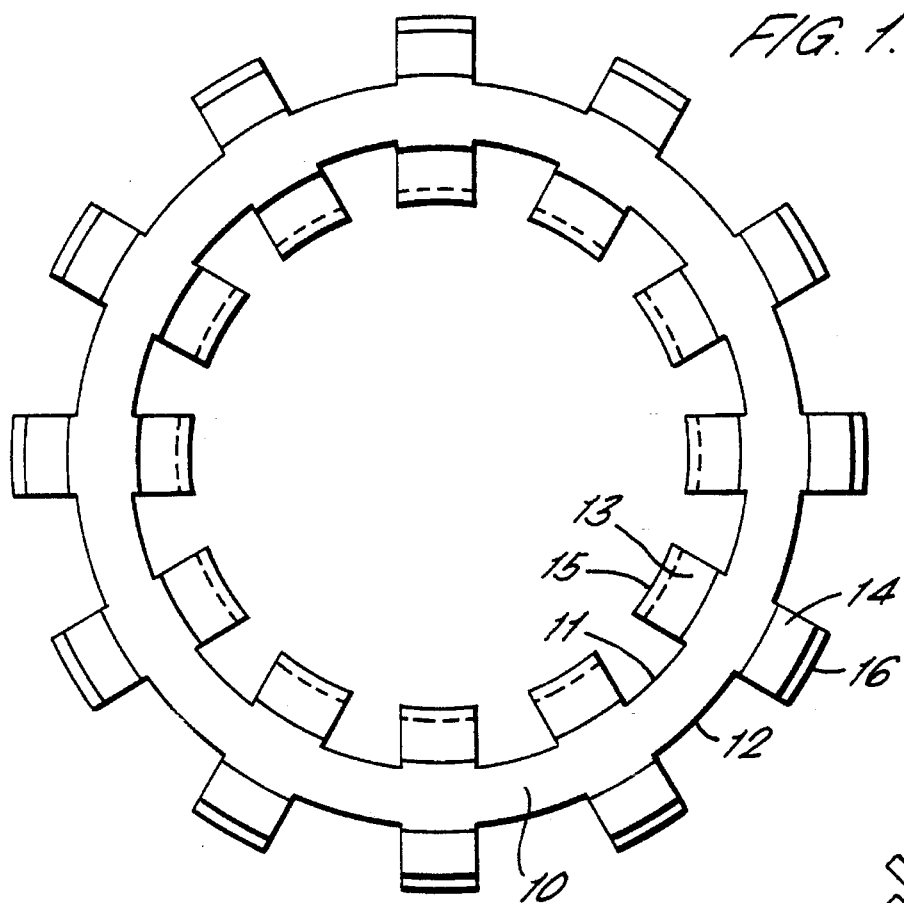
FIG. 1 is an elevation view of a grab ring for locking an inner cylindrical component in an encircling cylindrical bore of another component.
Figure 2:
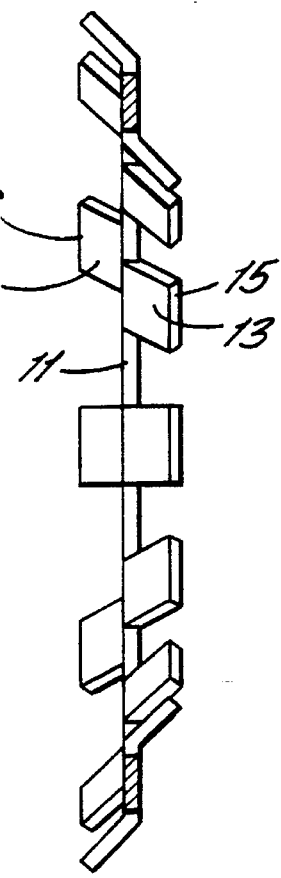
FIG. 2 is a side view of the grab ring of FIG. 1.

Referring firstly to FIGS. 1 and 2 of the drawing, there is shown a grab ring formed in a a hard spring steel and comprising a flat annular element 10 lying in a radial plane and having inner and outer edges 11, 12. The inner edge has a multiplicity of equi-spaced integral generally rectangular profile teeth 13 projecting inwardly and to one side of the plane of the annular element and the outer periphery 12 of the element has a corresponding set of integral generally rectangular teeth 14 formed opposite the teeth 13 and projecting outwardly to the other side of the element. The inner teeth 13 provide inwardly facing edges 15 to engage and bite into the surface of a component with the grab ring and the outer teeth 14 provide outwardly facing edges 16 to engage and bite into a surface encircling the grab ring. Preferably the side edges of the teeth extend radially of the annular element so that the teeth taper slightly towards their outer ends.

Figure 3:
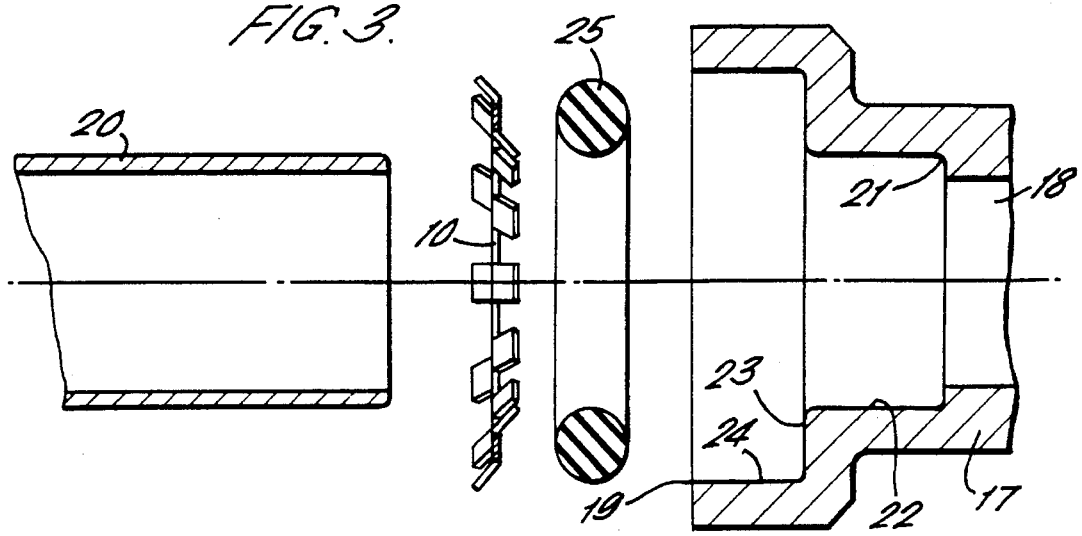
FIG. 3 shows a tube, the grab ring of FIG. 1, a seal and a socket in alignment ready for assembly.

The grab ring according to the invention has a wide variety of applications and is particularly suitable for locking a tube in a coupling body with a seal if required to form a sealed joint. Such an arrangement is illustrated in FIGS. 3 to 5 which reference will now be made.

A coupling body 17 has a throughway 18 which is open at one end 19 of the coupling body to receive an end part of a tube 20 to be fixed and sealed in the coupling body. The throughway 18 is of smaller diameter than the tube 20 and to accommodate the tube is increased in diameter of step 21 to a bore 22 in which the tube 20 is a close fit. The bore 22 is increased in diameter again at a step 23 adjacent the open end of the throughway to form an open socket 24. The socket receives an "O" ring seal 25 to seal between the socket and tube 20 and also the grab ring for locking the tube in the socket. The grab ring is dimensioned so that the outer teeth bear against and bit into the surface of the socket 24 and the inner teeth bear against and bite into the surface of the tube 20.

Figure 4:
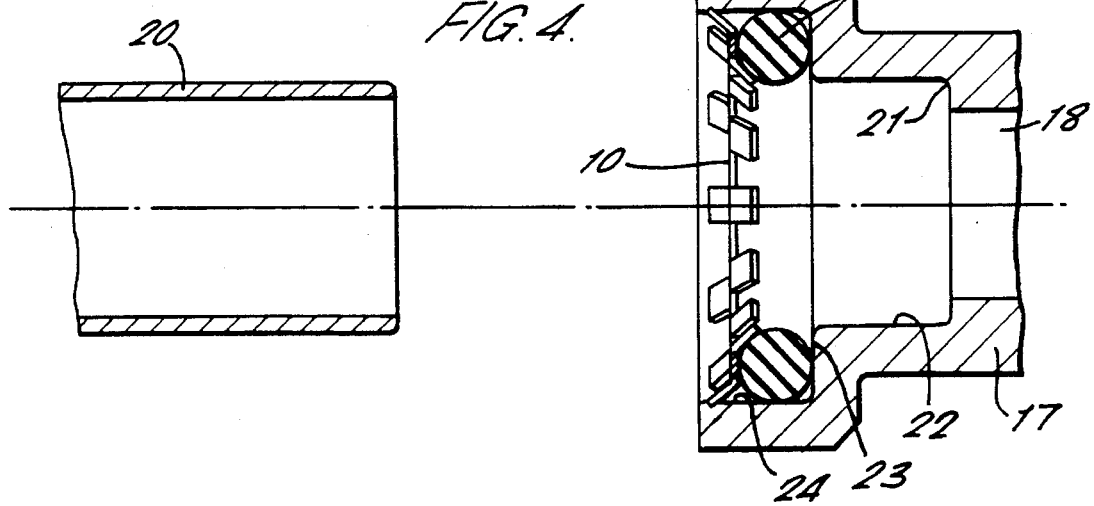
FIG. 4 shows the socket of FIG. 3 with the seal and grab ring inserted ready to receive the tube.

In FIG. 4, the seal 25 has been inserted in the socket 24 against the step 23, and the grab ring is then offered up with the outer teeth of the ring inclined outwardly of the socket so that as the ring is inserted into the socket, the teeth can flex to allow a ring to enter the socket and in situ bite into the surface of the socket to retain the ring as shown in FIG. 4.

Figure 5:
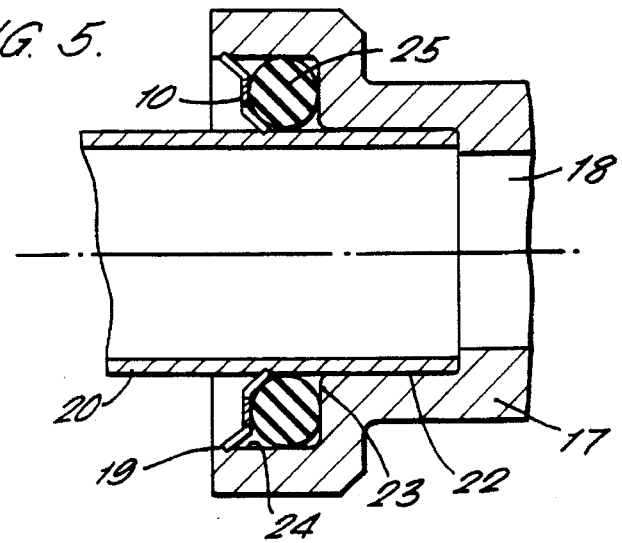
FIG. 5 shows the socket of FIG. 4 with the tube inserted.

The inner teeth 13 of the grab ring are angled into the throughway to allow the tube 20 to be inserted through the grab ring into the bore 22 to engage the shoulder 21 as shown in FIG. 5. When the tube is in place the teeth bite into the surface of the tube to hold it in place. The seal 25 is trapped between the grab ring and shoulder 23 and is thereby held in sealing engagement between the encircling surface of the socket, the shoulder 23 and the outer surface of the tube.

FIGS. 6 to 8 of the drawings show a similar arrangement in which the grab ring is embodied in the seal 25 with the annular element 10 of the ring disposed at the centre of the seal and the teeth 13, 14 projecting from the surface of the seal. The arrangement is otherwise similar to that of FIGS. 3 to 5.

Figure 9:
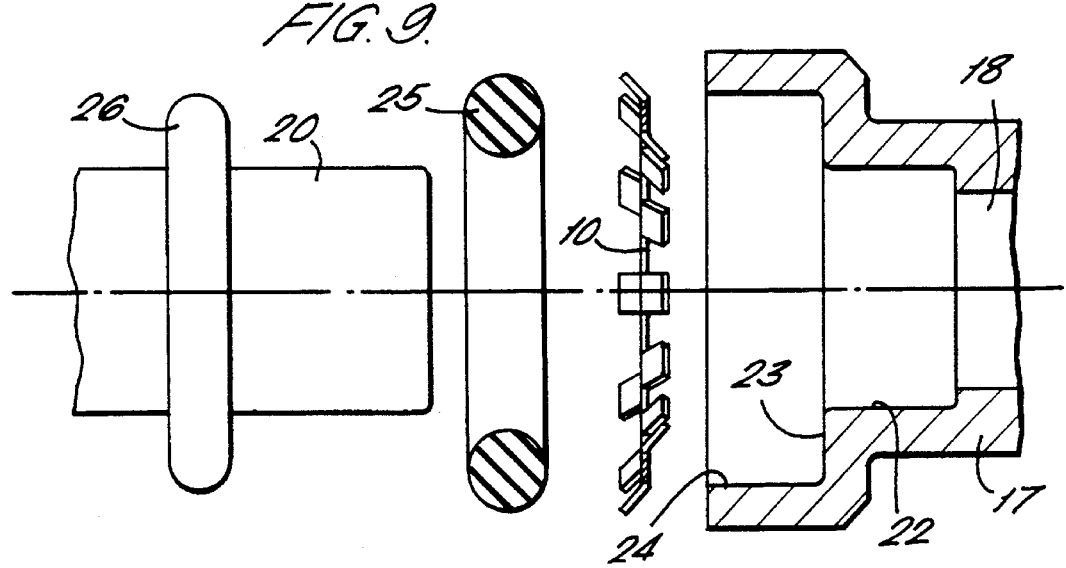
FIG. 9 shows a similar arrangement to that of FIG. 4 with the tube provided with an enlarged bead adjacent its end to be inserted in the socket.
Figure 10:
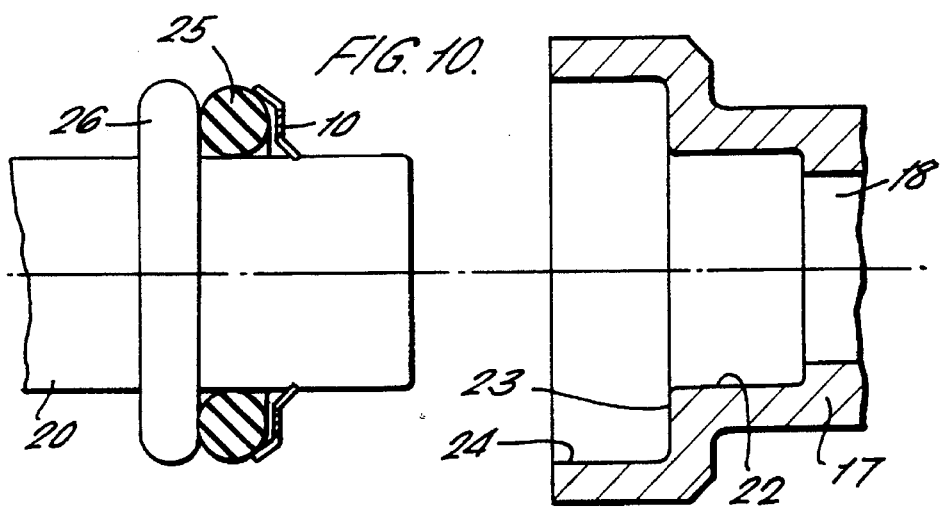
FIG. 10 shows the components of FIG. 9 with the seal and grab ring assembled on the end of the tube.
Figure 11:
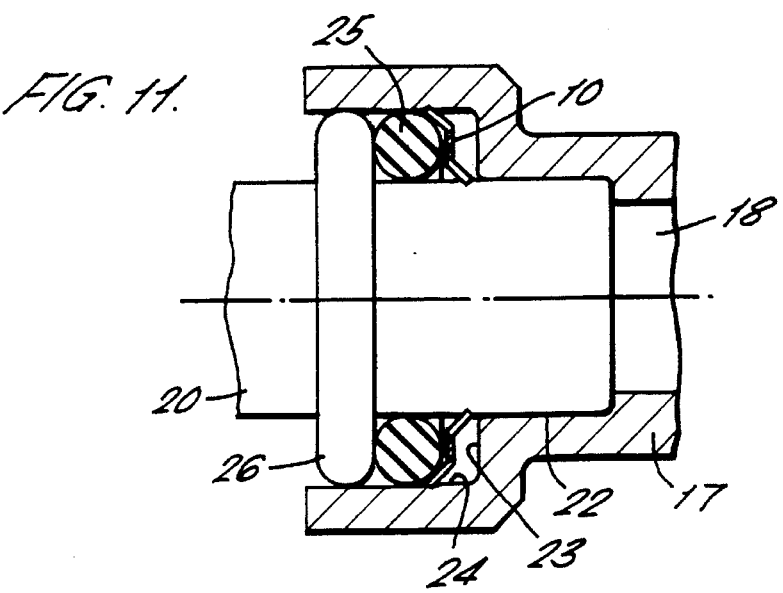
FIG. 11 shows the tube end inserted in the socket.

A further similar arrangement is shown in FIGS. 9 to 11 in which the tube 20 is formed with a encircling bead 26. In this case the seal 25 is inserted in the end of the tube against the bead 26 and the grab ring is then located on the tube to hold the seal against the bead. The resulting assembly is then inserted in the socket 24 at the open end of the throughway with a tube 20 projecting into the bore 22 and the outer periphery of the grab ring engaging the inner surface of the socket to retain the assembly in the socket.

Figure 12:
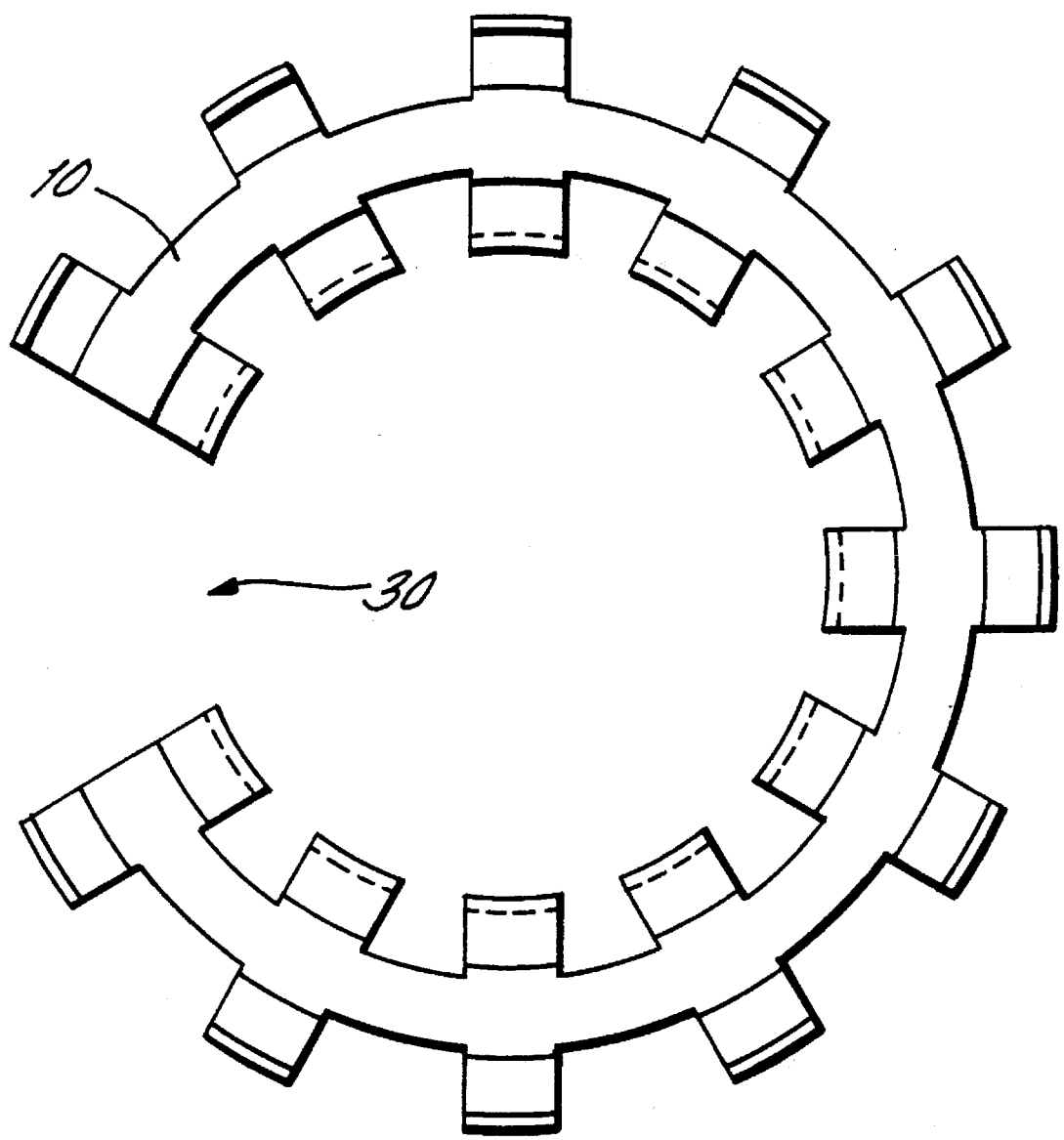
FIG. 12 shows a modified form of the grab ring of FIGS. 1 and 2 in which a radial slot is formed through the grab ring, to allow the ring to be opened for assembly on a component.

FIG. 12 shows a modified form of the grab ring in which a radial slot indicated at 30 is cut through the ring to allow the ring to be opened by flexing the ends of the ring away from each other to enable the ring to be engaged around a tube in a radial direction.

Figure 13:
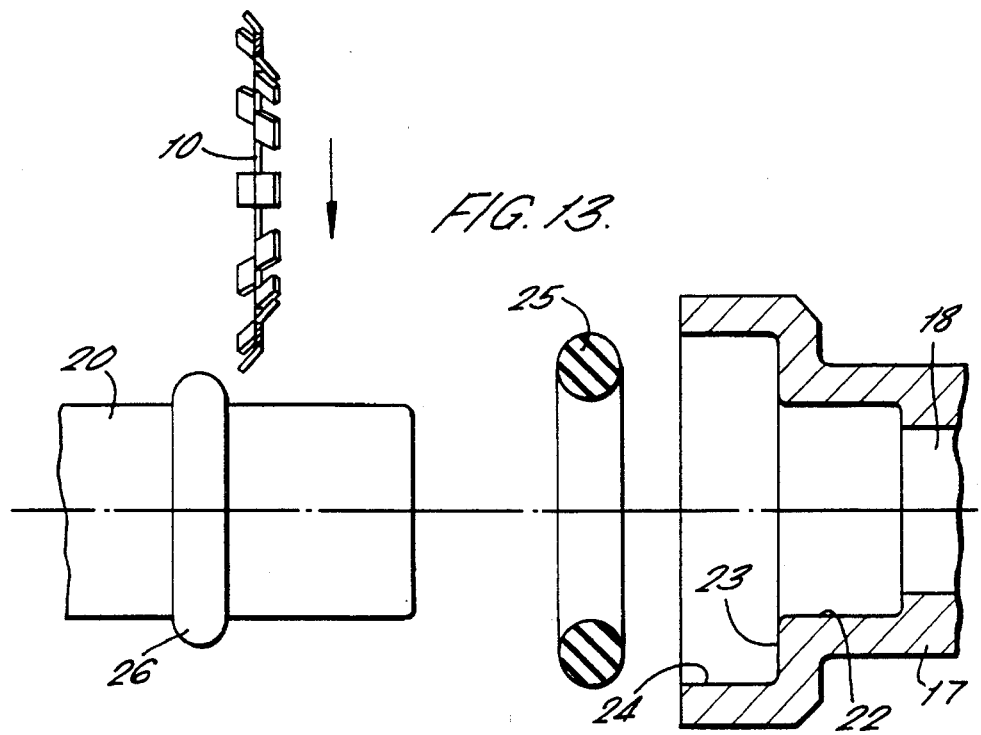
FIGS. 13 to 15 are similar to FIGS. 9 to 11 utilising the grab ring of FIG. 12.
Figure 14:
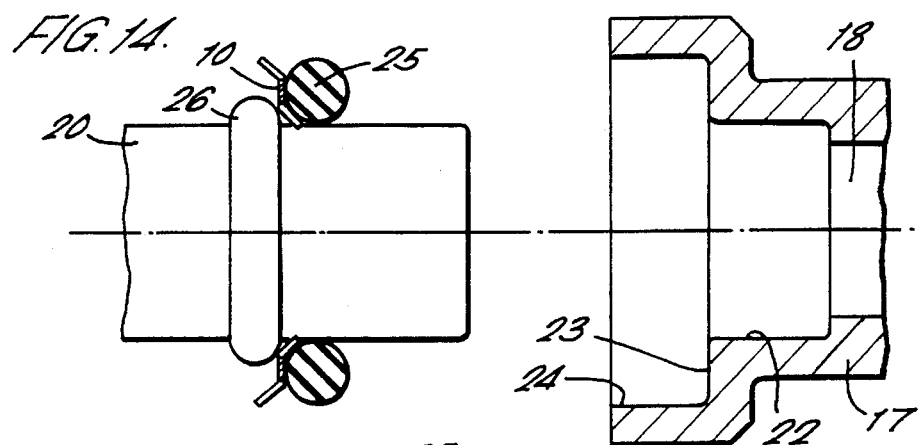
Figure 15:
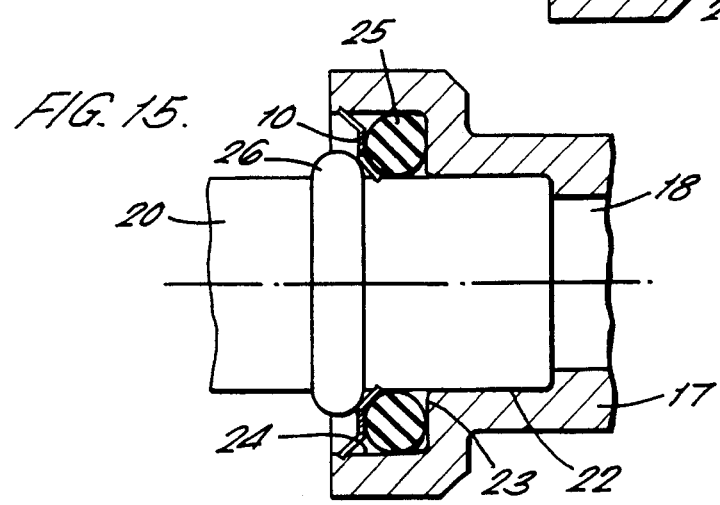

FIGS. 13 to 15 show an assembly similar to that as FIGS. 9 to 11 referred to above in which the grab ring is illustrated as being engaged on the end of the tube 13 in a radial direction in FIG. 13. In this case the grab ring is assembled on the end of the tube against the bead 26, the seal is then located on the end of the tube as shown in FIG. 14 and the assembly is inserted in the socket.

FIGS. 16 to 18 show a similar arrangement in which the tube 20 has a pair of spaced beads 31, 32 adjacent to its end and the grab ring is assembled on the tube between the beads. The seal is located against the bead 32 adjacent the end of the tube. The bead 32 is of larger diameter than bead 31 to be a close fit in socket 24 to retain the seal in the socket when subject to pressure.

Figure 19:
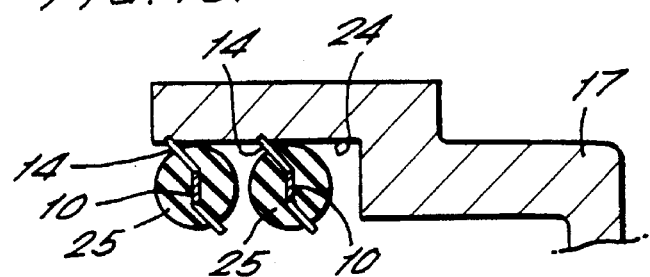
FIG. 19 is a section through part of a socket with two composite grab rings/seals disposed therein.

FIG. 19 shows part of a socket for a coupling body in which two grab rings both embodied in resilient seals are mounted to receive and engage a tube.

Figure 20:
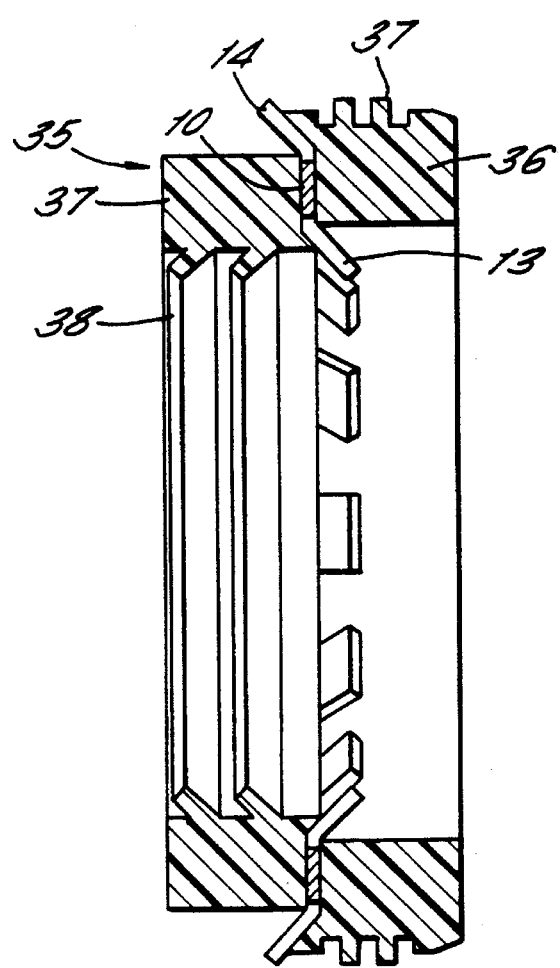
FIG. 20 is a section through a thick wall resilient sleeve embodying the grab ring in accordance with FIGS. 1 and 2.

FIG. 20 shows a further arrangement in which a grab ring is embodied in a stepped thick walled resilient sleeve 35 having a larger diameter portion 36 to one side of the grab ring and the smaller diameter portion 37 to the other side. The larger diameter portion 36 extends partway up the outwardly projecting teeth 14 and is formed with a pair of encircling ribs 37. The outwardly projecting teeth 14 of the grab ring are arranged to lock the grab ring/sleeve in a bore and the encircling ribs 37 form a seal with the bore.

The smaller diameter portion 37 of the sleeve to the other side of the grab ring extends partway up the inwardly projected teeth of the grab ring and is formed with a pair of obliquely angled annular sealing elements 38 facing in the opposite direction to the teeth 30 to seal with a surface of a tube extending through the sleeve/grab ring assembly.

FIG. 21 of the drawings shows a coupling body and tube similar to that of FIGS. 3 to 5 referred to above with a sleeve/grab ring arrangement of FIG. 20 for securing and sealing the tube in the coupling body. In FIG. 22 the sleeve/grab ring assembly has been inserted in the socket 24 of the coupling body 17, the outwardly projecting teeth 14 holding the assembly in the socket and the encircling ribs 37 sealing with the surface of the socket. The tube 20 can then be inserted through the angled seals 38 around the inner periphery of the sleeve and through the teeth 13 of the grab ring into the bore 22 formed in the socket for the tube. The teeth 13 hold the tube against withdrawal and the seals 38 form a sealing engagement with the surface of the tube as can be seen in FIG. 23.

FIGS. 24 to 26 show a similar sequence in which the sleeve/grab ring is assembled on the tube 21 and the tube/ sleeve assembly is inserted in the socket in the coupling body.

I claim:

1. A grab ring comprising a substantially flat annular element having one set of teeth projecting outwardly from an outer periphery of the element at an inclined angle to the annular element to one side thereof and a second set of teeth projecting inwardly from an inner periphery of the element at an inclined angle to the plane of the annular element to the other side thereof to engage a pair of inner and outer concentric cylindrical surfaces to permit relative movement between the surfaces in one direction and to prevent relative movement between the surfaces in the opposite direction, the first and second sets of teeth substantially arranged directly opposite to one another and being radially spaced apart a distance equal to the width of the flat annular element.

2. A grab ring as claimed in claim 1, wherein the annular element lies in a radial plane having radially spaced inner and outer edges, one set of teeth projecting outwardly from the outer edge of the element and angled to the radial plane of the element to one side thereof and the other set of teeth projecting inwardly of the inner edge of the annular element and being angled to the opposite side of the annular plane of the element.

3. A grab ring as claimed in claim 1, wherein the teeth are of generally rectangular shape.

4. A grab ring as claimed in claim 1, wherein a multiplicity of teeth are provided at spaced locations around said edges of the annular elements.

5. A grab ring as claimed in claim 1 wherein the teeth are located in pairs directly opposite one another around the edges of the annular elements.

6. A grab ring as claimed in claim 1 embodied in an annular sealing element with the ends of the teeth of the grab ring projecting from the surface of the annular sealing element.

7. A grab ring as claimed in claim 1, wherein the ring is embodied in a resilient sleeve halfway along the sleeve with one set of teeth projecting outwardly at the sleeve, the outer periphery of the sleeve having annular sealing ribs to one side of the grab ring and the inner periphery of the sleeve having inner sealing ribs to the other side of the grab ring.

8. A grab ring as claimed in claim 1, wherein the ring has a radial slot through the ring at one location in its periphery to enable the ring to be opened radially for mounting in a radial direction on a pipe or tube.

9. A grab ring as claimed in claim 1, wherein the teeth have radial edges.

* * * * *